Oct. 3, 1933.  M. LOUGHEAD  1,928,836
HOSE COUPLER
Filed Oct. 11, 1928   2 Sheets-Sheet 1
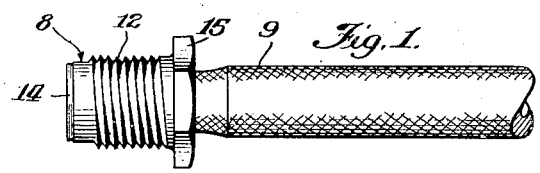
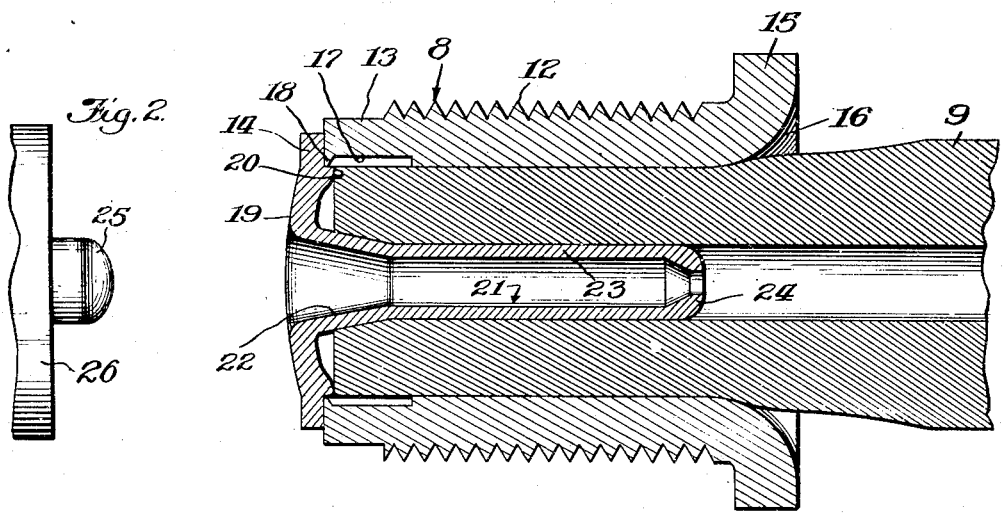
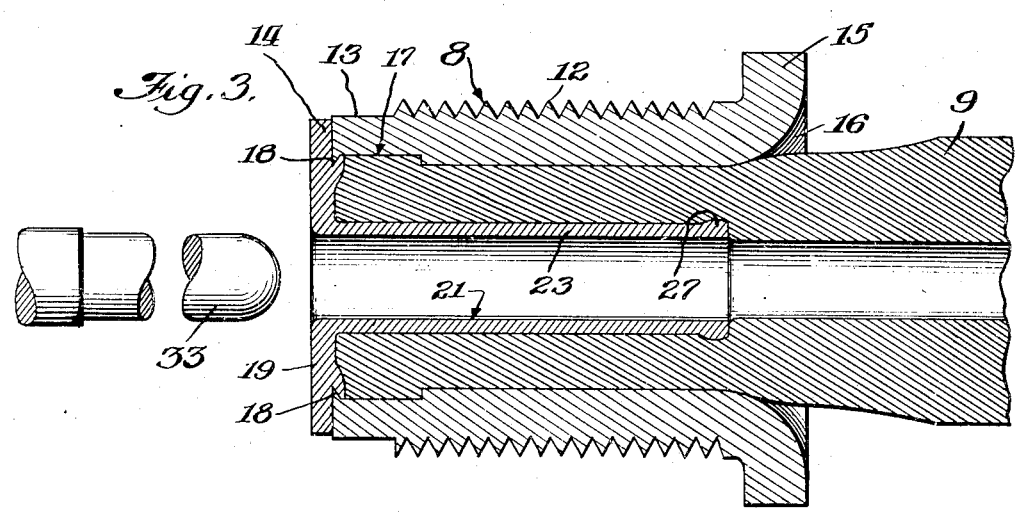
Inventor
Malcolm Loughead
By Williams, Bradbury, McCaleb & Hinkle
Attys.

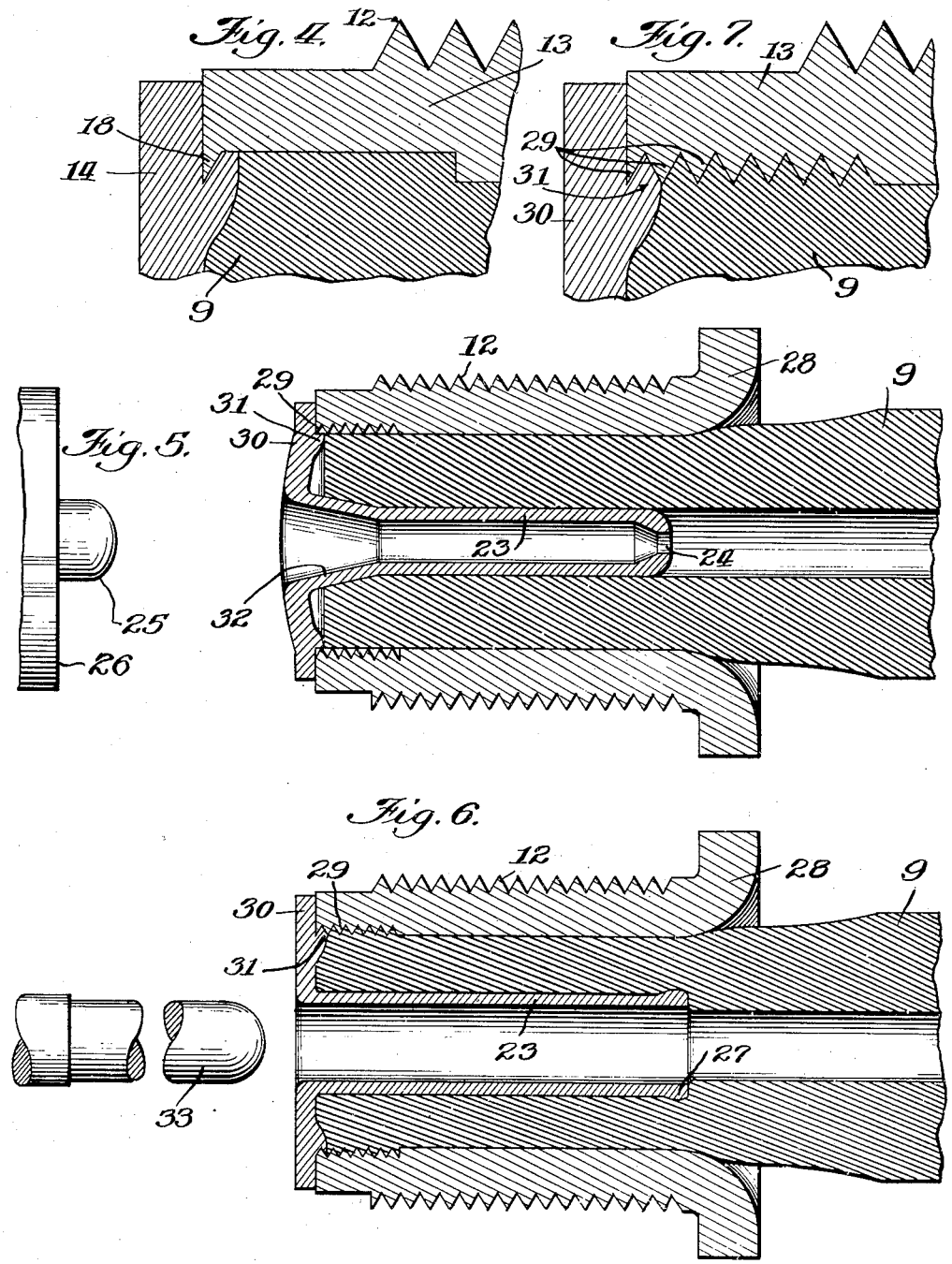

Patented Oct. 3, 1933

1,928,836

UNITED STATES PATENT OFFICE 1,928,836

HOSE COUPLER

Malcolm Loughead, Detroit, Mich., assignor to Hydraulic Brake Company, Los Angeles, Calif., a corporation of California Application October 11, 1928. Serial No. 311,721

8 Claims. (Cl. 29—88.2)

My invention relates to hose couplers and particularly to the attachment of the coupler to the hose.

It is especially suitable for use in connection with flexible compressible hose, such as used in hydraulic brake mechanism.

One of the objects of my invention is to provide an improved hose coupler.

Another object is to provide a coupling that will not separate when subject to the severe longitudinal or separative forces incident to high pressure service.

A further object is to provide a hose coupling which is not subject to leakage under high pressures.

A further object is to provide a simple and economical method of constructing the improved coupling.

Another object is to provide a simple, reliable and relatively inexpensive hose coupling for high pressure duty.

Other features and advantages of the invention will appear as the description proceeds.

In the drawings:

Fig. 1 is a side elevation of a coupler shown attached to a compressible flexible hose;

Fig. 2 is an enlarged longitudinal cross section of the hose and coupler assembled as they appear prior to the forming operation;

Fig. 3 is a similar cross section of the hose and coupler after the forming operation as they appear when completed;

Fig. 4 is a fragmentary detail section of the interlocking connection between the sleeve and the thimble of the connection;

Fig. 5 is a cross section of a modified form of coupler, showing the assembly prior to the forming operation;

Fig. 6 is a cross section of the modified coupler after the forming operation as they appear when completed; and Fig. 7 is a fragmentary detail section of the interlocking connection between the sleeve and the thimble of the modified coupler.

Referring to the drawings, and more particularly to Fig. 1, a coupler 8 is shown attached to a hose 9. The coupler is provided with an external thread 12 for attaching the same to an appropriate complementary connector associated with a pressure fluid container, another hose or the like. The coupler comprises generally a tubular sleeve 13 which may be a stamping upon which the threads 12 are formed and a thimble 14 of any suitable material preferably copper. The sleeve has a cylindrical portion with a flange 15 at the rear end thereof, the flange being provided with a hexagonal periphery to facilitate the threading of the coupler to another member. The bore of sleeve 13 at the flanged end is given an outward flare 16 for the purpose of avoiding a sharp edge against the hose and obviating an abrupt bend when the hose is bent relative to the coupler. At its forward end sleeve 13 is provided, upon its interior surface, with an annular groove 17 which is cut close to the end of the sleeve, leaving a small and rather sharp annular ridge 18 projecting inwardly therefrom.

The thimble 14 includes a flange or annular disc shaped portion 19 having an annular ledge 20 on its inner surface near the outer rim. The central portion of the disc is made convex and has a nipple 21 projecting rearwardly therefrom. The forward end of nipple 21 is formed with an outward flare or conical portion 22, the rear portion 23 of the nipple being cylindrical and, at the rear end, being partly closed by an inturned flange 24.

The rearward end of the nipple has an enlarged section adjoining the flange, the material of which together with the material of the flange, is utilized in forming a bead 27 in the forming operation.

In assembling the hose connection, the end of the hose may be reduced slightly in cross section by abrading some of the material in the outer layer of the hose. The purpose of abrading the outer layer of the hose is to insure that the outer surface of the hose is concentric with the opening in the hose and also to insure that the end of the hose has the proper diameter. This diameter should be such that the hose will be slightly compressed when inserted in the sleeve so that upon its subsequent expansion the tension in the fabric layers which are imbedded in a hose of this type will not be so great as to damage the end of the hose. The parts are assembled as shown in Fig. 2 with the end of the sleeve abutting the disc 14 and the annular ridge 18 resting upon the ledge 20 of the thimble.

A mandrel having a flat base 26 and a short centering plunger 25 which is of such diameter as to fit into the central aperture in the disc is forced against the convex portion of disc 19, flattening this disc and expanding it radially outwardly so that the ridge 18 will be firmly imbedded in the ledge 20 which will extend to the bottom of the groove 17.

During the flattening of the disc, the conical portion 22 of the nipple will be moved further into the hose, but on account of the conical shape of this portion the hose surrounding this portion will not be compressed around it so firmly as to prevent its inward movement. Contraction of the central opening in the disc during the flattening operation is prevented by the pressure of plunger 25 therein.

After the disc 19 has been flattened, an expanding tool 33 is forced into the thimble, expanding the forward conical portion thereof and thereby forcing the material of the end of the hose radially outwardly into groove 17. Further movement of the expanding tool similarly expands or enlarges the rear cylindrical portion of the thimble, thereby causing the hose thereabout to be tightly compressed against the interior wall of the sleeve 13. Finally when the expanding tool reaches the end of the nipple and the flange 24, the end is forced outwardly to form an annular bead 27 indenting and interlocking with the interior surface of the hose. Expanding tool 33 is of such dimensions that when thimble 14 has been expanded, its bore will be substantially the same as the bore of the hose as shown in Fig. 3.

Figs. 5, 6 and 7 illustrate a modified form of coupler in which a sleeve 28 is provided on its interior surface with a thread 29 instead of the groove heretofore described. Thimble 30 in this instance is identical with thimble 14 of the preferred form of coupling.

In the forming operation the ledge 31 on the inside face of the disc of thimble 30 will be forced into the thread 29, and the material of the hose upon the expansion of the cone 32, will be forced into the remaining grooves of the thread 29 which are not occupied by ledge 31. In the detail view of Fig. 7, the first groove of the thread 29 is shown occupied by the ledge of the thimble 30, and the remaining grooves are occupied by material of the hose. Thead 29 progresses in the same direction as thread 12 on the exterior of the sleeve so that a rotative force upon thimble 30 due to a rotation of the connector in attaching the same will result in a tendency to tighten the thimble in the sleeve.

In connectors as heretofore described the hose is firmly clamped between the sleeve and the thimble which together with the effect of the bead at the end of the thimble and material forced into the groove of the sleeve render the connection capable of resisting high fluid pressures in the hose without leakage or danger of the hose and connector being separated. The tendency of the connector and hose to separate is effectively resisted by the interlocking connections between the thimble and sleeve and between the hose, sleeve and thimble.

Article claims covering the subject-matter disclosed in this application will be found in my copending application, Serial No. 333,308, filed January 18, 1929, which is a continuation in part of the present application.

Having illustrated and described the nature and embodiment of my invention, what I claim and desire to secure by United States Letters Patent is as follows:

1. A method of attaching a connector to a flexible hose which consists in placing a sleeve over the hose, providing and inserting a thimble having a convex flange with an inward projection in the hose with the flange abutting the end of the hose and the sleeve, depressing the convex portion of the thimble to cause said projection to interlock with the sleeve and expanding the thimble to clamp the hose.

2. The method of attaching a coupler to a hose which includes providing a sleeve and a nipple having, respectively, portions capable of being deformed into interlocking relation with each other and inserting the hose in a coupler sleeve, inserting a nipple into the passageway through the hose, applying longitudinal force to said nipple to interlock said nipple with said sleeve, and then expanding said nipple to clamp said hose between said nipple and said sleeve.

3. The method of attaching a coupler to a hose which includes providing a rigid sleeve with an internal recess compressing an appreciable length of said hose adjacent one end thereof by inserting it in said sleeve, inserting a nipple in the passageway through said hose, expanding the extreme end of said portion of the hose into said recess and to its original size, and clamping the remainder of said portion between said nipple and said sleeve.

4. The method of attaching a coupler to a hose including providing a rigid sleeve with an internal recess, reducing the outside diameter of a portion of said hose adjacent one end thereof and simultaneously inserting said portion in said rigid sleeve, inserting a nipple into the passageway through sad hose and in a single operation interlocking said nipple with said sleeve, expanding the extreme end of said portion of the hose into said recess and to its original size, and firmly clamping the remainder of said portion of the hose between said nipple and said sleeve.

5. The method of attaching a coupler to a non-expansible flexible hose which includes providing a rigid sleeve with an internal recess, reducing the diameter of a portion of the hose adjacent one end thereof by inserting said portion in said sleeve, inserting a nipple in the passageway through said hose, applying longitudinal pressure to said nipple to firmly interlock said nipple with said sleeve against movement in either direction relative to said sleeve, and expanding said nipple to return a part of said portion of the hose to its original size by expanding it into said recess and to firmly clamp the remainder of said portion of the hose between said sleeve and said nipple.

6. The method of attaching a coupler to a hose which includes providing a rigid sleeve, a hose, and a nipple, inserting a portion of the hose into said sleeve, inserting said nipple into said hose, interlocking said sleeve and said nipple, and expanding said nipple to form a bead thereon and to clamp said hose between said nipple and said sleeve.

7. The method of attaching a coupler to a non-expansible flexible hose which includes providing a hose, a nipple having a part provided with a substantially smooth cylindrical outer surface, and a rigid sleeve having an internal recess, compressing and inserting a portion of said hose into said rigid sleeve, inserting said part of the nipple into said hose, interlocking the nipple and sleeve, and expanding said nipple to clamp said hose between said nipple and said sleeve and to form a bead at the end of said nipple.

8. The method of attaching a coupler to a non-expansible flexible hose having a small internal diameter and a relatively thick wall which includes providing a hose, a rigid sleeve having an internal recess and an internal shoulder, and a nipple having a cylindrical portion and a base including an edge, inserting a portion of said hose into said sleeve, inserting the cylindrical portion of said nipple into said hose, interlocking said sleeve and nipple so that said edge is firmly clamped against said shoulder, and expanding said nipple to force said hose into said recess and to clamp said hose between said sleeve and said nipple.

MALCOLM LOUGHEAD.